(12) United States Patent
Badding et al.

(10) Patent No.: US 8,197,979 B2
(45) Date of Patent: Jun. 12, 2012

(54) THERMO-MECHANICAL ROBUST SEAL STRUCTURE FOR SOLID OXIDE FUEL CELLS

(75) Inventors: Michael Edward Badding, Campbell, NY (US); Jacqueline Leslie Brown, Lindley, NY (US); Steven F Hoysan, Cypress, TX (US); Thomas Dale Ketcham, Big Flats, NY (US); Scott Christopher Pollard, Big Flats, NY (US); Dell Joseph St Julien, Watkins Glen, NY (US); Sujanto Widjaja, Corning, NY (US)

(73) Assignee: Corning Incorporated, Corning, NY (US)

( * ) Notice: Subject to any disclaimer, the term of this patent is extended or adjusted under 35 U.S.C. 154(b) by 1040 days.

(21) Appl. No.: 11/999,350

(22) Filed: Dec. 5, 2007

(65) Prior Publication Data

US 2008/0166616 A1 Jul. 10, 2008

Related U.S. Application Data

(60) Provisional application No. 60/874,431, filed on Dec. 12, 2006.

(51) Int. Cl.
*H01M 8/02* (2006.01)
*H01M 8/12* (2006.01)

(52) U.S. Cl. ........................................ 429/463; 429/479

(58) Field of Classification Search .......... 429/479–489, 429/460, 463, 507–511
See application file for complete search history.

(56) References Cited

U.S. PATENT DOCUMENTS

| | | | |
|---|---|---|---|
| 5,085,455 A | 2/1992 | Bogner et al. | 280/618 |
| 5,273,837 A | 12/1993 | Aitken et al. | 429/30 |
| 6,045,935 A | 4/2000 | Ketcham et al. | 429/30 |
| 6,302,402 B1 | 10/2001 | Rynders et al. | 277/530 |
| 6,623,881 B2 | 9/2003 | Badding et al. | 429/30 |
| 6,852,436 B2 | 2/2005 | Badding et al. | 429/32 |
| 2001/0044041 A1 | 11/2001 | Badding et al. | 429/32 |

(Continued)

FOREIGN PATENT DOCUMENTS

WO WO01/89010 A1 11/2001

OTHER PUBLICATIONS

"Evolution of Wrinkles in Hard Films on Soft Substrates"; Zhenyu Huang, et al; 2004 The American Physical Society; 030601-1 to 030601-4. "Nonlinear Analyses of Wrinkles in a Film Bonded to a Compliant Substrate"; Z. Y. Huang et al; Journal of the Mechanics and Physics of Solids (2005); pp. 2101-2118.

*Primary Examiner* — Barbara Gilliam
*Assistant Examiner* — Maria J Laios
(74) *Attorney, Agent, or Firm* — Svetlana Z. Short

(57) ABSTRACT

A solid oxide fuel cell comprising a thin ceramic electrolyte sheet having an increased street width is disclosed. Also disclosed are solid oxide fuel cells comprising: a substantially flat ceramic electrolyte sheet, a substantially flat ceramic electrolyte sheet having a seal area of greater thickness than the active area of the electrolyte sheet, a ceramic electrolyte sheet that overhangs the seal area, a ceramic electrolyte sheet and at least one substantially flat border material, and a border material having a non-linear edge. Methods of making a solid oxide fuel cell in accordance with the disclosed embodiments are also disclosed. Also disclosed are methods of making a solid oxide fuel cell wherein the seal has a uniform thickness, wherein the seal is heated to remove a volatile component prior to sealing, and wherein the distance between the frame and the ceramic electrolyte sheet of the device is constant.

10 Claims, 7 Drawing Sheets

U.S. PATENT DOCUMENTS

| | | | |
|---|---|---|---|
| 2003/0096147 A1* | 5/2003 | Badding et al. | 429/30 |
| 2003/0175573 A1* | 9/2003 | Yoo et al. | 429/34 |
| 2003/0215689 A1 | 11/2003 | Keegan | 429/35 |
| 2003/0224238 A1 | 12/2003 | Finn et al. | 429/35 |
| 2004/0170893 A1 | 9/2004 | Nakaishi et al. | 429/185 |
| 2004/0197636 A1* | 10/2004 | Couse et al. | 429/38 |
| 2006/0003213 A1 | 1/2006 | Ketcham et al. | 429/30 |
| 2007/0003821 A1 | 1/2007 | Belchuk | 429/44 |
| 2008/0142148 A1* | 6/2008 | Nielsen et al. | 156/89.12 |

* cited by examiner

Rupture Pressure (inches $H_2O$)

Data Summary

- ☐ No Border: (4 Specs) Mean=36.8; Stdev=5.93; m=6.40; $S_0$=39.3
- ○ Border: (3 Specs) Mean=51.2; Stdev=1.74; m=32.4; $S_0$=51.9

Effect of YSZ Overhang

□ 0°/pre-bake/Overhang: (5 Specs) Mean=35.9; Stdev=5.56; m=7.40; $S_0$=38.0
● 0°/pre-bake/No overhang: (4 Specs) Mean=36.5; Stdev=9.33; m=3.73; $S_0$=40.3
△ 2.5°/no pre-bake/ No overhang: (4 Specs) Mean=50.0; Stdev=5.34; m=9.47; $S_0$=52.3
▼ 2.5°/no pre-bake/Overhang: (5 Specs) Mean=86.8; Stdev=33.4; m=3.19; $S_0$=96.0

THERMO-MECHANICAL ROBUST SEAL STRUCTURE FOR SOLID OXIDE FUEL CELLS

This application claims the benefit of U.S. Provisional Application No. 60/874,431, filed Dec. 12, 2006, entitled "THERMO-MECHANICAL ROBUST SEAL STRUCTURE FOR SOLID OXIDE FUEL CELLS".

STATEMENT REGARDING GOVERNMENT SUPPORT

This invention was made with government support under Cooperative Agreement 70NANB4H3036, awarded by the National Institute of Standards and Technology (NIST). The United States government has certain rights in this invention.

BACKGROUND OF THE INVENTION

1. Field of the Invention

The present invention relates generally to fuel cell devices and more particularly to solid oxide fuel cell devices that utilize designs and/or seal structures that can minimize device failure due to thermal mechanical stress.

2. Technical Background

Solid oxide fuel cells (SOFC) have been the subject of considerable research in recent years. Solid oxide fuel cells convert the chemical energy of a fuel, such as hydrogen and/or hydrocarbons, into electricity via electro-chemical oxidation of the fuel at temperatures, for example, of about 700 to about 1000° C. A typical SOFC comprises a negatively charged oxygen-ion conducting electrolyte sandwiched between a cathode layer and an anode layer. Molecular oxygen is reduced at the cathode and incorporated in the electrolyte, wherein oxygen ions are transported through the electrolyte to react with, for example, hydrogen at the anode to form water.

Specific designs, such as those described in U.S. Pat. No. 6,852,436, include electrode-electrolyte structures comprising a solid electrolyte sheet incorporating a plurality of positive and negative electrodes bonded to opposite sides of a thin flexible inorganic electrolyte sheet.

Other designs, such as those disclosed in U.S. Pat. Nos. 5,273,837 and 5,085,455, describe thermal shock resistant solid oxide fuel cells and thin, inorganic sheets that have strength and flexibility to permit bending without fracturing and have excellent temperature stability over a range of fuel cell operating temperatures.

SOFC devices are typically subjected to large thermal-mechanical stresses due to the high operating temperatures and rapid temperature cycling of the device. Such stresses can result in deformation of device components and can adversely impact the operational reliability and lifetime of SOFC devices.

The electrolyte sheet of a SOFC device is typically sealed to a frame support structure in order to keep fuel and oxidant gases separate. In some cases, the thermal mechanical stress and resulting deformation may be concentrated at the interface between the electrolyte sheet and the seal, resulting in a failure of the seal, the electrolyte sheet, and/or the SOFC device. When a thin, flexible ceramic sheet is utilized as the electrolyte in a SOFC device, there is a higher likelihood of premature failure of the electrolyte sheet itself. Differential gas pressure and interactions between the device, the seal, and the frame due to temperature gradients and the mismatch of component properties (e.g., expansion and rigidity) may lead to increased stress at the seal and the unsupported region of the electrolyte sheet adjacent to the seal. Large electrolyte sheets are especially subject to failure caused by stress induced fracturing of electrolyte sheet wrinkles.

U.S. Patent Publication 2006/0003213 describes the problem of stress related cracking of the SOFC device electrolyte sheet and discloses a patterned electrolyte sheet designed to compensate for environmentally induced strain and provide increased failure resistance to the device. U.S. Patent Publications 2003/0215689 and 2003/0224238 describe a metal foam seal and a high temperature felt sealing material that can be utilized to address the build up of strain at the bonding region of the electrolyte, seal, and frame. However, alternative and/or additional thermal stress minimization approaches may also serve as mitigation schemes to overcome thermal mechanical failures of fuel cell devices.

Thus, there is a need to address the thermal mechanical integrity of solid oxide fuel cell seals and electrolyte sheets, and other shortcomings associated with solid oxide fuel cells and methods for fabricating and operating solid oxide fuel cells. These needs and other needs are satisfied by the articles, devices and methods of the present invention.

SUMMARY OF THE INVENTION

The present invention relates to ceramic electrolytes and seal structures useful in attaching a thin electrolyte sheet to a support so as to minimize device failure due to thermal mechanical stress. The present invention addresses at least a portion of the problems described above through the use of novel electrolyte designs, novel seal structures, and methods of making a solid oxide fuel cell.

In a first embodiment, the present invention provides a solid oxide fuel cell device comprising a frame and a ceramic electrolyte sheet in communication with the frame, wherein the electrolyte sheet comprises an active area positioned adjacent to the center of the ceramic electrolyte sheet, and an inactive area positioned around the active area, wherein the inactive area comprises a street width area positioned adjacent to the active area, and a seal area positioned around the street width area, wherein the distance between the seal area and the active area is greater than about 2 mm, and wherein the ceramic electrolyte sheet has a thickness of less than about 50 μm, preferably less than 45 μm. Preferably, the distance between the seal area and the active area is greater than about 2.5 mm, more preferably greater than 3 mm, and in some examples greater than 5 mm and 7 mm.

In a second embodiment, the present invention provides a solid oxide fuel cell device comprising a frame and a ceramic electrolyte sheet in communication with the frame, wherein the ceramic electrolyte sheet comprises an active area positioned at the center of the ceramic electrolyte sheet, and an inactive area positioned around the active area, wherein the inactive area comprises a street width area positioned adjacent to the active area, and a seal area positioned around the street width area, wherein the ceramic electrolyte sheet seal area is substantially flat, and wherein at least a portion of the ceramic electrolyte sheet has a thickness of less than about 50 μm, preferably less than 45 μm, more preferably less than 30 μm, 20 μm, or 18 μm.

In a third embodiment, the present invention provides a solid oxide fuel cell device comprising a frame, a ceramic electrolyte sheet in communication with the frame, and at least one border material, wherein the ceramic electrolyte sheet comprises an active area positioned at the center of the ceramic electrolyte sheet and an inactive area positioned around the active area, wherein the inactive area comprises a street width area positioned adjacent to the active area, and a seal area positioned around the street width area, wherein at least a portion of the at least one border material is in contact with at least a portion of the seal area, and wherein the border material is substantially flat.

In a fourth embodiment, the present invention provides a method of making a solid oxide fuel cell device, comprising providing a frame and a device comprising a ceramic electrolyte sheet, applying a seal to at least a portion of the ceramic electrolyte sheet, and then attaching the device to the frame such that the seal has a uniform thickness.

In a fifth embodiment, the present invention provides a method of making a solid oxide fuel cell device, comprising providing a frame and a device comprising a ceramic electrolyte sheet, and attaching the device to the frame using a seal, such that the seal has a uniform thickness, and such that the distance between the frame and the device is constant.

Additional embodiments and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain embodiments of the present invention and together with the description, serve to explain, without limitation, the principles of the invention. Like numbers represent the same elements throughout the figures.

DETAILED DESCRIPTION OF THE INVENTION

Figure 1:
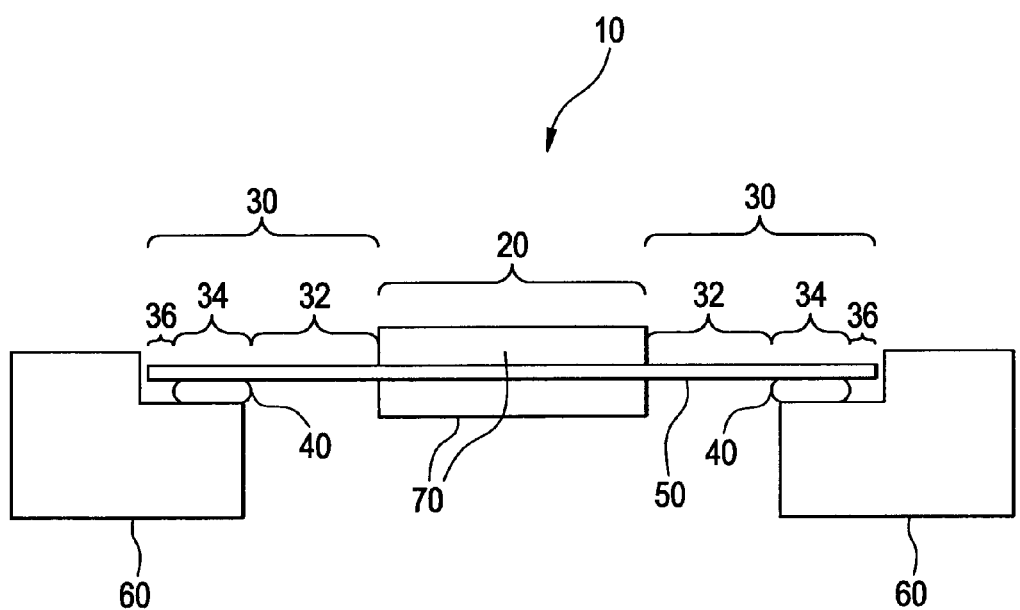
FIG. 1 is a schematic diagram illustrating various areas of a ceramic electrolyte sheet, in accordance with various embodiments of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular embodiments only and is not intended to be limiting.

The following description of the invention is provided as an enabling teaching of the invention in its currently known embodiments. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes embodiments having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the description includes both embodiments of the invention including and excluding the component.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As briefly introduced above, the present invention provides novel electrolyte designs and a novel seal structure that can reduce and/or prevent device failure due to thermal mechanical stresses. The proposed methods can lead to improved thermal mechanical integrity and robustness of a solid oxide fuel cell device. Several approaches to improve thermal mechanical integrity of fuel cell components are disclosed herein.

Although the electrolytes, seals, and methods of the present invention are described below with respect to a solid oxide fuel cell, it should be understood that the same or similar electrolytes, electrodes, and methods can be used in other applications where a need exists to seal a ceramic sheet to a support frame. Accordingly, the present invention should not be construed in a limited manner.

Solid Oxide Fuel Cell

A conventional solid oxide fuel cell typically has an electrode assembly supported by a frame member. The electrode assembly is comprised of a ceramic electrolyte sheet sandwiched between an anode and a cathode. The ceramic electrolyte can comprise any ion-conducting material suitable for use in a solid oxide fuel cell. The electrolyte can comprise a polycrystalline ceramic such as zirconia, yttria, scandia, ceria, or a combination thereof, and can optionally be doped with at least one dopant selected from the group consisting of the oxides of Y, Hf, Ce, Ca, Mg, Sc, Nd, Sm, Eu, Gd, Tb, Dy, Ho, Er, Tm, Yb, Lu, In, Ti, Sn, Nb, Ta, Mo, W, or a mixture thereof. The electrolyte can also comprise other filler and/or processing materials. An exemplary electrolyte is a planar sheet comprised of zirconia doped with yttria, also referred to as yttria stabilized zirconia (YSZ). Solid oxide fuel cell electrolyte materials are commercially available (Ferro Corporation, Penn Yan, N.Y., USA) and one of skill in the art could readily select an appropriate ceramic electrolyte material.

A solid oxide fuel cell can further comprise at least one anode and at least one cathode, positioned on opposing surfaces of an electrolyte. A solid oxide fuel cell can comprise a single chamber, wherein both the anode and the cathode are on the same side of the electrolyte. The electrodes can comprise any materials suitable for facilitating the reactions of a solid oxide fuel cell. The anode and cathode can comprise different or similar materials and no limitation to materials or design is intended. The anode and/or cathode can form any geometric pattern suitable for use in a solid oxide fuel cell. The electrodes can be a coating or planar material positioned parallel to and on the surface of the ceramic electrolyte. The electrodes can also be arranged in a pattern comprising multiple independent electrodes. For example, an anode can be a single, continuous coating on one side of an electrolyte or a plurality of individual elements, such as strips, positioned in a pattern or array.

An anode can comprise, for example, yttria, zirconia, nickel, or a combination thereof. A large variety of other electron and ion conductors as well as mixed electron and ion conductors can also utilized. They are, for example, lanthanum gallates, zirconia doped with ceria or other rare earths, singly or in combination, copper, iron, cobalt and manganese. An exemplary anode can comprise a cermet comprising nickel and the electrolyte material such as, for example, zirconia.

A cathode can comprise, for example, yttria, zirconia, manganate, cobaltate, bismuthate, or a combination thereof. Exemplary cathode materials can include, yttria stabilized zirconia, lanthanum strontium manganate, and combinations thereof.

The electrode assembly is typically connected to the support frame by a seal composition disposed between the frame and the electrolyte sheet. To that end, the seal of a solid oxide fuel cell can comprise any material suitable for use in sealing an electrolyte and a frame of a solid oxide fuel cell. For example, the seal can comprise a glass frit composition or a metal, such as a foamed metal. A glass frit seal can further comprise ceramic materials and/or coefficient of thermal expansion matching fillers. It is typically preferred that the seal comprise a glass frit. Solid oxide fuel cell components, such as electrode, frame, and seal materials are commercially available and one of skill in the art could readily select an appropriate material for a component of a solid oxide fuel cell.

During fuel cell operation, the electrolyte, frame, and seal can be subjected to operating temperatures of from about 600° C. to about 1,000° C. In addition, these components can experience rapid temperature cycling during, for example, startup and shutdown cycles. The thermal mechanical stresses placed on these components can result in deformation, fracture, and/or failure of the components or the entire fuel cell device. The present invention provides several approaches to minimize such deformation, fracture, and/or failure. The various approaches can be used individually or in combination, as appropriate, and the present invention is not intended to be limited to a single embodiment. All of the embodiments described herein are intended to describe embodiments containing an electrolyte, an electrolyte and seal, and/or an electrolyte, seal, and frame. If an element required for fuel cell operation is not specifically recited, embodiments both including and excluding the element are intended and should be considered part of the invention.

Increased Street Width

With reference to FIG. 1 a schematic cross-section of an exemplary solid oxide fuel cell device 10 is shown. The fuel cell device 10 comprises an electrode assembly connected to and supported by a frame 60. The electrolyte assembly is further comprised of an electrolyte sheet 50 having at least one electrode 70 connected thereto. The at least one electrode 70 is connected to a first portion 20 of the electrolyte sheet to form an active area of the electrode assembly. A plurality of electrode pairs (anodes and cathodes) may also be utilized. The remaining portion 30 of the electrolyte sheet provides an inactive area.

In one embodiment, the active area of the electrode assembly is positioned concentrically with the remaining inactive portion 30, such that the inactive area 30 surrounds the active area. Still further, the inactive area extends to the edge of the ceramic electrolyte sheet. To this end, as used herein, "concentric" or "concentrically" refer to an area, portion, or region of the electrode assembly and/or components thereof, which surrounds a different area, portion, or region of the electrode assembly and/or components thereof. It should be understood that as used herein concentric areas, portions, or regions are not limited only to those embodiments having the same center. Further, by use of the term "concentric, no geometry or shape is intended. For example, the areas can be concentric circles, squares, or other patterns suitable for design of a solid oxide fuel cell. One area can have the same or different geometry than other areas. Further, the design or shape of a specific concentric area is not required to be uniform and can be, for example, an elongated oval, a rectangle, or a design having a constantly varying boundary.

The inactive area 30 can further comprise a plurality of inactive concentric electrolyte sheet regions. For example, a portion of the inactive area adjacent to the active area (or the center of the electrolyte sheet as shown) is typically referred to as the street width area 32. The street width area can extend from the active area outward to the portion of the inactive area in contact with the seal 40, referred to as the seal area 34. Beyond the seal area 34, the inactive area can optionally comprise an overhang area 36 that, when present, extends to the peripheral edge of the electrolyte sheet. If no overhang area is present, the seal area can extend to the peripheral edge of the sheet.

Figure 2:
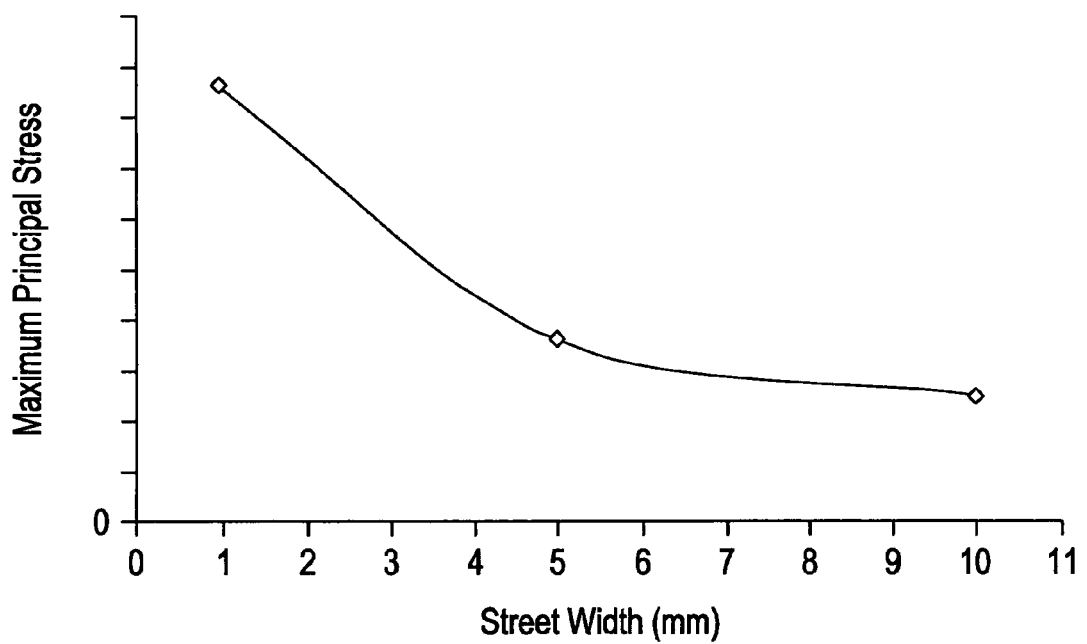
FIG. 2 depicts a finite element calculation illustrating the dependence of maximum tensile stress on the inactive area of the electrolyte sheet as a function of street width for a solid oxide fuel cell device under temperature loading.

As used herein, "street width" refers to the distance between the active area and the seal area of an electrolyte sheet, at the point where the active area and seal area are closest to each other. When the street width of an electrolyte sheet is small, buckling modes resulting from thermal mechanical deformation cannot easily be distributed and can result in fracture of the seal or the electrolyte sheet in the seal area or adjacent street width area. Not wishing to be bound by theory, it is believed that increasing the street width of the electrolyte sheet can allow buckling modes to be distributed into a larger portion of the electrolyte sheet, thus preventing fracture and/or component failure. FIG. 2 illustrates the predicted decrease in maximum principal stress with increasing street width.

The ceramic electrolyte sheet of the present invention comprises a street width of greater than about 5 mm, for example, greater than about 5, 5.5, 6, 6.5, 7, 9, 11, 15, or 20 mm, preferably greater than about 7 mm, for example, greater than about 7, 7.2, 7.5, 7.8, 8, 9, 11, 15, 20, or 30 mm. In one embodiment, the ceramic electrolyte sheet has a street width of about 5.5 mm. In another embodiment, the ceramic electrolyte sheet has a street width of about 7.5 mm. The values described and claimed herein refer to the minimum street width. The dimensions of the street width area can vary along the surface of the electrolyte sheet and can be greater than the described values in at least a portion of the street width area.

The ceramic electrolyte sheet according to any embodiment of the present invention can have any thickness suitable for use in a solid oxide fuel cell. The ceramic electrolyte sheet can be less than about 50 µm, for example, less than about 50, 48, 45, 40, 35, 30, 25, 20, 18, 15, 10, or 5 µm, preferably less than about 30 µm, for example, less than about 30, 28, 25, 20, 18, 15, 10, 8, or 5 µm, or more preferably less than about 20 µm, for example, less than about 20, 18, 15, 12, 10, 8, 6, or 5 µm. To that end, in another embodiment, the increased street width area of the present invention can also be expressed as a multiple of the thickness of the electrolyte sheet. For example, the street width can be from about 10 to about 2,000 times, for example, about 10, 12, 15, 20, 25, 50, 100, 150, 200, 300, 500, 700, 900, 1200, 1500, 1800, or 2000 times the thickness of the electrolyte sheet, preferably from about 400 to about 600 times, for example, about 400, 420, 440, 480, 500, 520, 540, 580, or 600 times the thickness of the electrolyte sheet. In one embodiment, the electrolyte sheet is about 50 µm thick and the street width is about 25 mm. In another embodiment, the electrolyte sheet is about 20 µm thick and the street width is about 10 mm, in another embodiment the electrolyte sheet is about 10 µm thick and the street width is about 5 mm, in yet other embodiments the electrolyte sheets are about 5 µm thick and the street widths are 2 mm and 2.5 mm wide.

Flatness of the Electrolyte

Another approach to prevent deformation and/or failure of solid oxide fuel cell components is to utilize a ceramic electrolyte sheet that is flat or substantially flat in the seal area. Stress from surface discontinuities or defects, such as wrinkles and/or deformations in the seal area of a ceramic electrolyte sheet can be difficult to distribute and can result in fracture and/or failure of the electrolyte sheet and/or the seal during temperature cycling or fuel cell operation. Such stress can be reduced or eliminated if the seal area of the electrolyte sheet is flat or at least substantially flat. As used herein, a substantially flat ceramic electrolyte sheet or portion or area of an electrolyte sheet refers to a sheet or portion thereof having a surface that does not comprise one or more wrinkles having an amplitude greater than about 300 µm and a wavelength less than about 1 cm. A wrinkle, if present, should have an amplitude (peak to valley) of about 300 µm or less, for example, about 1, 3, 8, 10, 25, 40, 80, 100, 120, 150, 180, 210, 230, 250, 270, or 300 µm or less, and a wavelength greater than about 1 cm, for example, greater than about 1, 1.5, 2, 4, 8, 10, or 30 cm. It is preferable that the ceramic electrolyte sheet comprise no wrinkles having an amplitude greater than about 100 µm and a wavelength less than about 4 cm. It is more preferable that the ceramic electrolyte sheet comprise no wrinkles.

A wrinkle in the seal area of the electrolyte sheet, if present, can vary in amplitude and/or wavelength along the seal area of the electrolyte sheet, provided that the amplitude is about 300 µm or less and the wavelength greater than about 1 cm. The stress from wrinkles and/or deformations having low amplitude and high wavelength (low frequency), in accordance with the present invention, can be more readily distributed to other areas of the ceramic electrolyte sheet, thus preventing deformation and failure.

In one embodiment, the ceramic electrolyte sheet of the present invention is attached to a frame with a seal, and the seal area of the electrolyte sheet does not comprise any wrinkles having an amplitude greater than about 300 µm and a wavelength less than about 1 cm. In another embodiment, the ceramic electrolyte sheet is attached to a frame with a seal, and the seal area of the electrolyte sheet is substantially flat and does not comprise any wrinkles having an amplitude greater than about 100 µm and a wavelength less than about 4 cm. In another embodiment, the ceramic electrolyte is attached to a frame with a seal, and the seal area of the electrolyte sheet is flat and does not comprise any detectable wrinkles and/or deformations.

The amplitude of a wrinkle, if present, can also be expressed as a multiple of the thickness of the ceramic electrolyte sheet. In this manner, the amplitude of a wrinkle, if present, should be less than about 50 times, for example, less than about 50, 40, 30, 20, 10, 5, or 2 times the thickness of the electrolyte sheet, preferably less than about 25 times, for example, less than about 25, 24, 22, 20, 18, 15, 12, 10, 7, 5, or 2 times the thickness of the electrolyte sheet. In one embodiment, the ceramic electrolyte sheet does not comprise one or more wrinkles having an amplitude greater than or equal to about 50 times the thickness of the electrolyte sheet. In a specific embodiment comprising a 20 µm electrolyte sheet attached to a frame, the electrolyte sheet does not comprise one or more wrinkles having an amplitude greater than or equal to about 1 mm. In another embodiment, the ceramic electrolyte sheet does not comprise one or more wrinkles having an amplitude greater than or equal to about 25 times the thickness of the electrolyte sheet. In a specific embodiment comprising a 20 µm electrolyte sheet attached to a frame, the electrolyte sheet does not comprise one or more wrinkles having an amplitude greater than or equal to about 500 µm.

In yet another embodiment, a peripheral portion of the electrolyte sheet and the outer portion of the inactive area can extend beyond, or overhang, the seal as illustrated in FIG. 1. An electrolyte sheet that overhangs or extends outward from the active area beyond the seal can reduce or eliminate stress induced deformations and/or failure resulting from the presence of defects and/or flaws located at the edge of the ceramic electrolyte sheet. Without an overhanging portion, such defects and/or flaws would be positioned within the seal area and could be subjected to stresses exceeding the tolerances of the electrolyte sheet material. In an overhanging configuration, stress at the seal area is applied to a more stable, non-edge portion of the ceramic electrolyte sheet. The overhanging portion of the ceramic electrolyte sheet can extend, or overhang, the seal area by from about 0.1 mm to about 50 mm, for example, about 0.1, 0.3, 0.8, 1, 2, 4, 8, 10, 15, 20, 25, 30, 35, 40, 45, 48, or 50 mm. In one embodiment, the electrolyte sheet overhangs the seal area by about 5 mm.

Thickness of Seal Area

Figure 3:
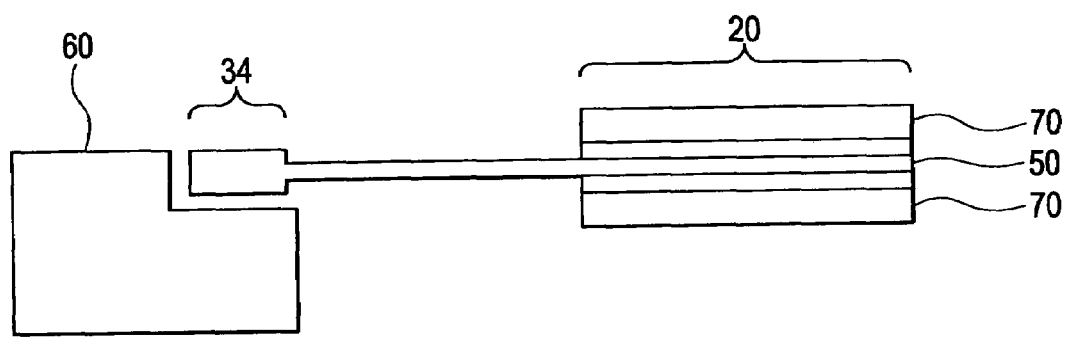
FIG. 3 is a schematic diagram illustrating a substantially flat seal area having an increased thickness in accordance with various embodiments of the present invention.

In a third approach, stress related deformation and failure can be reduced and/or prevented by utilizing a ceramic electrolyte sheet having a substantially flat seal area 34 having a thickness greater than the thickness of the active area 20, as illustrated in FIG. 3. The seal area thickness can be about 1.1 times, about 1.5 times, about 2 times the active area thickness, or more. The active area thickness, as used herein, is intended to describe the thickness of the ceramic electrolyte sheet and not include the thickness of an electrode layer deposited on at least one surface of the ceramic electrolyte sheet. The change in thickness from the active area to the seal area can comprise any suitable geometry, such as, for example, a step, a taper, or a combination thereof. It is preferred that the change in thickness comprise a design, such as a gradual taper, that does not create a stress point in the ceramic electrolyte sheet.

In one embodiment, the thickness of the seal area of a ceramic electrolyte sheet is about 30 µm, or about 1.5 times the 20 µm thickness of the active area of the electrolyte sheet. In another embodiment, the thickness of the seal area of the ceramic electrolyte sheet is about 60 µm, or about 2 times the 30 µm thickness of the active area of the electrolyte sheet. As the thickness of the electrolyte sheet, and hence the active area, can vary, the desired thickness of the seal area can vary as well.

Border Material

Figure 4:
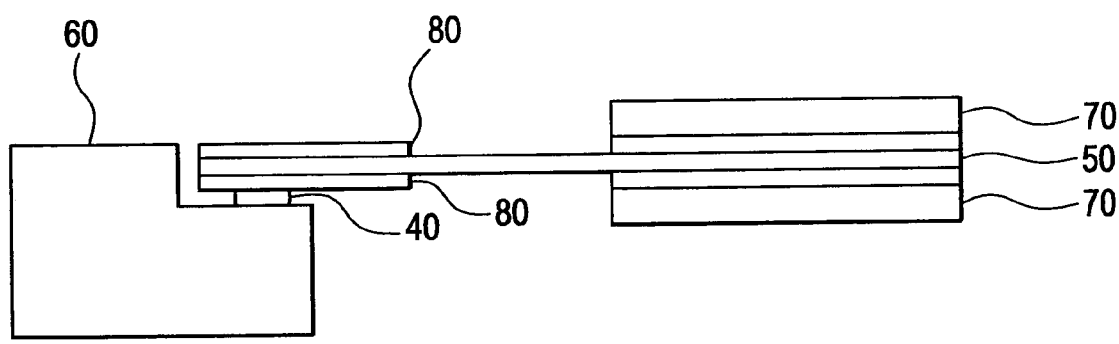
FIG. 4 is a schematic diagram illustrating a ceramic electrolyte sheet comprising a border material in accordance with various embodiments of the present invention.

In a fourth approach, stress related deformation and failure can be reduced and/or prevented by utilizing a thin ceramic electrolyte and at least one substantially flat border material disposed between the seal and the ceramic electrolyte sheet. At least a portion of the border material can be in contact with at least a portion of the seal area of the ceramic electrolyte sheet. With reference to FIG. 4, a border material 80 can contact at least a portion of the seal area 34 of the electrolyte sheet 50 and can improve the flatness of and increase the apparent thickness and stiffness of the electrolyte sheet, the advantages of which are both described herein. The at least one border material can be attached to the electrolyte sheet using any suitable method, such as, for example, printing, cementing, attaching with a frit material, or a combination thereof. A border material can be applied to a portion of the seal area of one surface of an electrolyte sheet, to the entire seal area of one surface of an electrolyte sheet, to the seal area of both surfaces of an electrolyte sheet, or a combination thereof.

The term "substantially flat" as it relates to a border material refers to the same amplitude and wavelength values as described for a substantially flat electrolyte sheet. A substantially flat border material does not comprise one or more wrinkles having an amplitude greater than about 300 µm and a wavelength less than about 1 cm. A wrinkle, if present, should have an amplitude (peak to valley) of about 300 µm or less, for example, about 1, 3, 8, 10, 25, 40, 80, 100, 120, 150, 180, 210, 230, 250, 270, or 300 µm or less, and a wavelength greater than about 1 cm, for example, greater than about 1, 1.5, 2, 4, 8, 10, or 30 cm. It is preferable that the border material comprise no wrinkles having an amplitude greater than about 100 µm and a wavelength less than about 4 cm. It is more preferable that the border material comprise no wrinkles.

A wrinkle in the border material, if present, can vary in amplitude and/or wavelength, provided that the amplitude is about 300 µm or less, and the wavelength greater than about 1 cm.

In one embodiment, the border material of the present invention does not comprise any wrinkles having an amplitude greater than about 300 µm and a wavelength less than about 1 cm. In another embodiment, the border material of the present invention is substantially flat and does not comprise any wrinkles having an amplitude greater than about 100 µm and a wavelength less than about 4 cm. In yet another embodiment, the border material of the present invention is flat and does not comprise any detectable wrinkles and/or deformations.

The thickness of the border material of the present invention can be from about 1 µm to about 10,000 µm, for example, about 1, 2, 4, 8, 10, 20, 40, 100, 250, 500, 1000, 2000, 4000, 8000, 9000, or 10000 µm, preferably from about 1 µm to about 20 µm, for example, about 1, 2, 4, 8, 10, 14, 16, 18, 19, or 20 µm, or more preferably from about 1 µm to about 3 µm, for example, about 1, 1.2, 1.5, 2, 2.5, 2.8, 2.9, or 3 µm.

The border material of the present invention can comprise any material suitable for use in a solid oxide fuel cell that can be substantially flat. The border material can comprise a metal, such as silver, palladium, a ceramic composition, such as, for example, the same composition as the ceramic electrolyte sheet, or a combination thereof. For example, glass, ceramic, porous ceramic, and least partially stabilized zirconia may be utilized. If multiple border materials are utilized, they can comprise similar or varying compositions. It is not necessary that all border materials comprise the same composition or geometry. Preferably, at least one boarder material (e.g., glass) has modulus lower than that of the ceramic electrolyte sheet An individual border material can also comprise a plurality of layers, for example, two, three, four or more layers. Each of the plurality of layers of an individual border material, if present, can comprise similar or varying compositions. In one embodiment, an individual border material is a single layer and does not comprise multiple layers. In another embodiment, an individual border material comprises three layers, wherein each of the three layers comprises the ceramic material of the electrolyte sheet. In another embodiment, an individual border material comprises two layers, wherein one layer comprises the ceramic material of the electrolyte sheet and the second layer comprises silver. In yet another embodiment, multiple border materials are positioned on opposing surfaces of the ceramic electrolyte sheet and each border material comprises a plurality of layers.

The border material of the present invention can have any modulus compatible with the design and components of the solid oxide fuel cell in which it is used. The border material should preferably have a modulus equal to or lower than that of the ceramic electrolyte sheet, more preferably a modulus lower than that of the ceramic electrolyte sheet.

The border material of the present invention can further comprise an adhesion promoter. An adhesion promoter can comprise any suitable material capable of improving the adhesion of a seal to an electrolyte sheet. The adhesion promoter can comprise a transition metal oxide, such as, for example, NiO. The adhesion promoter, if present, can be applied directly to the surface of a border material or to the portion of the electrolyte sheet surface to which the border material will attach. Border materials, such as ceramics and/or metals, and adhesion promoters are commercially available (Ferro Corporation, Penn Yan, N.Y., USA; Sigma-Aldrich, St. Louis, Mo., USA) and one of skill in the art could readily select an appropriate border material and/or adhesion promoter.

A border material, if present, can also overhang the seal area of the device in a manner similar to that described for an overhanging electrolyte sheet. In one embodiment, a ceramic electrolyte sheet is positioned such that at least a portion thereof overhangs the seal area, and a border material is attached to one surface of the electrolyte sheet and is in contact with at least a portion of the overhanging portion of the ceramic electrolyte sheet. FIG. 4 illustrates a cross section of an exemplary embodiment, in which two individual border materials are positioned on opposing sides of the ceramic electrolyte sheet. In FIG. 4, the border materials are in contact with the overhanging electrolyte sheet, and the border materials overhang the seal area to about the same extent as the electrolyte sheet. The border materials also extend into the street width area of the electrolyte sheet.

Undulating Border Geometry

Figure 5:
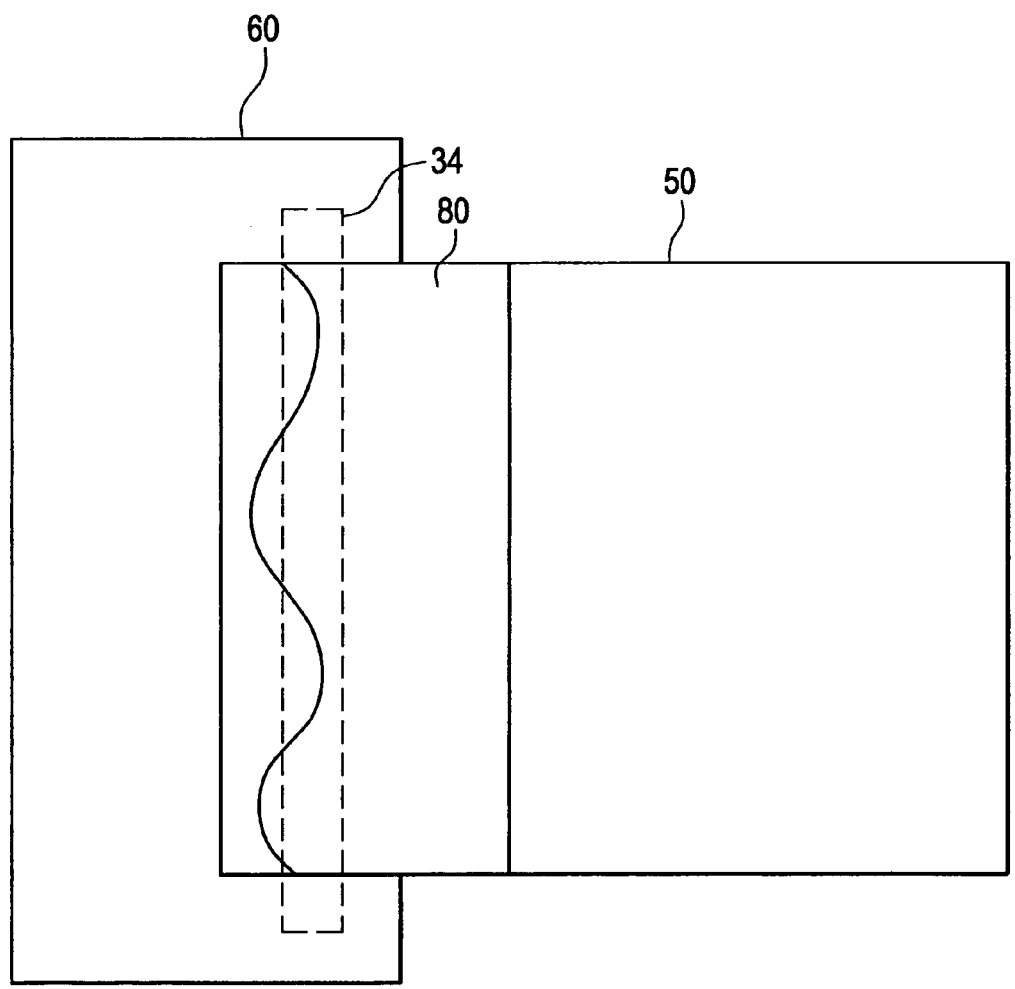
FIG. 5 depicts an exemplary border material having a non-linear first edge in accordance with various embodiments of the present invention.

In a fifth approach, stress related deformation and failure can be reduced and/or prevented by utilizing a substantially flat border material 80, as described herein, having a variable width, as illustrated in FIG. 5. The width of such a border material can vary along its length in any geometric pattern suitable for use in a solid oxide fuel cell. The border material can comprise a first edge positioned in proximity to the frame 60 and a second edge positioned in proximity to the street width area 32 of the ceramic electrolyte sheet 50, wherein the first edge is non-linear and wherein at least a portion of the at least one border material is in contact with the seal area and at least a portion of the at least one border material is in contact with the street width area. The border material can optionally comprise a non-linear second edge. A non-linear second edge, if present, can have the same or a different pattern than the non-linear first edge. A non-linear second edge can have a nonlinear pattern while the first edge is linear. Not wishing to be bound by theory, it is believed that a border material having a non-linear edge can better distribute stresses in the seal area and at the edge of both the border material and the ceramic electrolyte sheet. The non-linear edge of a border material can comprise any pattern suitable for use in a solid oxide fuel cell. The non-linear edge of a border material can comprise a regular repeating pattern, an irregular non-repeating pattern, or a combination thereof. It is preferable that the non-linear edge of the border material not comprise an acute angle or step change.

The first edge or a second edge of a variable width border material can comprise at least one variation having a wavelength of from about 0.5 mm to about 100 cm, for example, about 0.5 mm, 1 mm, 2 mm, 3 mm, 4 mm, 5 mm, 6 mm, 7 mm, 8 mm, 12 mm, 15 mm, 17 mm, 18 mm, 20 mm, 23 mm, 30 mm, 35 mm, 40 mm, 80 mm, 100 mm, 500 mm, 1 cm, 10 cm, 25 cm, 50 cm, 60 cm, 75 cm or 100 cm, preferably from about 3 mm to about 3 cm, for example, about 3 mm, 7 mm, 10 mm, 15 mm, 20 mm, 24 mm, 27 mm, 1 cm, 2 cm, 2.5 cm, or 3 cm. The at least one variation can also have an amplitude of from about 0.5 mm to about 5 cm, for example, about 0.5 mm, 1 mm, 3 mm, 4 mm, 6 mm, 8 mm, 15 mm, 17 mm, 18 mm, 20 mm, 25 mm, 35 mm, 45 mm, 1 cm, 2 cm, 3 cm, 4 cm, or 5 cm, preferably from about 5 mm to about 2 cm, for example, about 5 mm, 6 mm, 8 mm, 10 mm, 12 mm, 15 mm, 18 mm, or 2 cm.

In one embodiment, the first edge of the variable width border material comprises a repeating pattern having both a wavelength and an amplitude of about 1 cm. In another embodiment, the first edge of the variable width border material comprises a sinusoidal pattern. In yet another embodiment, both the first edge and the second edge of the variable width border material are non-linear and/or sinusoidal.

In another embodiment, the second edge of the variable width border material comprises a repeating pattern having a local wavelength or periodicity. The second edge of the variable width border material comprises a repeating pattern with a local wavelength or periodicity, where the active area comprises more than one electrode and wherein the second edge comprises at least one variation having a periodicity that is approximately the period of the cell spacing, a periodicity that is approximately ($\pm 0.1$) the multiple of the period of the cell spacing or an integer fraction, for example $\frac{1}{2}$, $\frac{1}{3}$, $\frac{1}{4}$, $\frac{1}{5}$, $\frac{1}{6}$, $\frac{1}{7}$, $\frac{1}{8}$, $\frac{1}{9}$, and $\frac{1}{10}$ of the period of the cell spacing.

SOFC Fabrication

The present invention is intended to cover the fabrication of a solid oxide fuel cell comprising each of approaches recited herein for reducing and/or eliminating deformation and failure of fuel cell components, individually and in various combinations.

The present invention provides a method of making a solid oxide fuel cell comprising providing a ceramic electrolyte sheet, a frame, and a seal, wherein the ceramic electrolyte sheet has a thickness less than about 50 µm, for example, less than about 50, 48, 45, 40, 35, 30, 25, 20, 15, 10, or 5 µm, preferably less than about 30 µm, for example, less than about 30, 28, 25, 20, 15, 10, 8, or 5 µm, or more preferably less than about 20 µm, for example, less than about 20, 18, 15, 12, 10, 8, 6, or 5 µm; and attaching the ceramic electrolyte sheet to the frame with the seal, such that the ceramic electrolyte sheet has a street width of greater than about 5 mm, for example, greater than about 5, 5.5, 6, 6.5, 7, 9, 11, 15, or 20 mm, preferably greater than about 7 mm, for example, greater than about 7, 7.2, 7.5, 7.8, 8, 9, 11, 15, 20, or 30 mm.

The ceramic electrolyte sheet can also be attached to the frame such that the ceramic electrolyte sheet has a street width of from about 10 to about 2,000 times, for example, about 10, 12, 15, 20, 50, 100, 150, 200, 300, 500, 700, 900, 1200, 1500, 1800, or 2000 times the thickness of the electrolyte sheet, preferably from about 400 to about 600 times, for example, about 400, 420, 440, 480, 500, 520, 540, 580, or 600 times the thickness of the electrolyte sheet. In one embodiment, the ceramic electrolyte sheet is attached to the frame such that the electrolyte sheet has a street width of about 500 times the thickness of the electrolyte sheet. In another embodiment, the ceramic electrolyte sheet is attached to the frame such that the electrolyte sheet has a street width of about 2,000 times the thickness of the electrolyte sheet.

The present invention also provides a method for making a solid oxide fuel cell comprising providing a flat or substantially flat ceramic electrolyte sheet, a frame, and a seal; and attaching the flat or substantially flat ceramic electrolyte sheet to the frame with the seal. The flat or substantially flat ceramic electrolyte sheet does not comprise one or more wrinkles having an amplitude greater than about 300 µm and a wavelength less than about 1 cm. A wrinkle, if present, should have an amplitude (peak to valley) of about 300 µm or less, for example, about 1, 3, 8, 10, 25, 40, 80, 100, 120, 150, 180, 210, 230, 250, 270, or 300 µm or less, and a wavelength greater than about 1 cm, for example, greater than about 1, 1.5, 2, 4, 8, 10, or 30 cm. It is preferable that the ceramic electrolyte sheet comprise no wrinkles having an amplitude greater than about 100 µm and a wavelength less than about 4 cm. It is more preferable that the ceramic electrolyte sheet comprise no wrinkles.

In one embodiment, a substantially flat ceramic electrolyte sheet is attached to a frame using a glass frit seal. In another embodiment, a substantially flat ceramic electrolyte sheet is attached to a frame using a glass frit seal, such that at least a portion of the ceramic electrolyte sheet overhangs the seal area, extending beyond the seal area of the electrolyte sheet towards the frame.

The present invention also provides a method of making a solid oxide fuel cell comprising providing a frame, a seal, and a substantially flat ceramic electrolyte sheet having a variable thickness; and attaching the substantially flat ceramic electrolyte sheet to the frame using the seal such that at least a portion of the ceramic electrolyte sheet in contact with the seal has a thickness greater than the thickness of at least a portion of the active area of the ceramic electrolyte sheet. In one embodiment, a substantially flat ceramic electrolyte sheet is attached to a frame using a seal, such that the thickness of the portion of the ceramic electrolyte sheet in contact with the seal is about 1.5 times the thickness of the active area of the ceramic electrolyte sheet.

The present invention also provides a method of making a solid oxide fuel cell comprising providing a frame, a seal, a ceramic electrolyte sheet, and at least one substantially flat border material; and attaching the ceramic electrolyte sheet to the frame using the seal, such that the at least one border material is in contact with at least a portion of the seal area of the ceramic electrolyte sheet.

The thickness of the border material of the present invention can be from about 1 µm to about 10,000 µm, for example, about 1, 2, 4, 8, 10, 20, 40, 100, 250, 500, 1000, 2000, 4000, 8000, 9000, or 10000 µm, preferably from about 1 µm to about 20 µm, for example, about 1, 2, 4, 8, 10, 14, 16, 18, 19, or 20 µm, or more preferably from about 1 µm to about 3 µm, for example, about 1, 1.2, 1.5, 2, 2.5, 2.8, 2.9, or 3 µm.

The border material can comprise any material suitable for use in a solid oxide fuel cell that can be substantially flat. The border material can comprise a metal, such as silver, palladium, a ceramic composition, such as, for example, the same composition as the ceramic electrolyte sheet, or a combination thereof. If multiple border materials are utilized, they can comprise similar or varying compositions. It is not necessary that all border materials comprise the same composition or geometry.

An individual border material can also comprise a plurality of layers, for example, two, three, four or more layers. Each of the plurality of layers of an individual border material, if present, can comprise similar or varying compositions. In one embodiment, a single layer border material is positioned between the ceramic electrolyte sheet and a glass frit. In another embodiment, a multiple layer border material, comprising three layers, is positioned on one surface of the ceramic electrolyte sheet prior to attaching the ceramic electrolyte sheet to the seal. In yet another embodiment, a border material comprising an adhesion promoter is positioned between the ceramic electrolyte sheet and the seal such that both the border material and the ceramic electrolyte sheet overhang the seal area.

The present invention also provides a method of making a solid oxide fuel cell comprising providing a frame, a seal, a ceramic electrolyte sheet, and a substantially flat border material having at least one non-linear edge; and attaching the ceramic electrolyte sheet to the frame using the seal such that the border material is positioned between the ceramic electrolyte sheet and the seal and such that at least a portion of the non-linear edge of the border material is positioned in the seal area of the ceramic electrolyte sheet. In one embodiment, the border material has a non-linear edge comprising a repeating wave pattern having both a wavelength and an amplitude of about 1 cm, and the border material is positioned between the ceramic electrolyte sheet and the seal such that at least a portion of the non-linear edge is in contact with at least a portion of the seal area of the electrolyte sheet.

The present invention also provides a method of making a solid oxide fuel cell comprising providing a frame, a seal, a ceramic electrolyte sheet, and a substantially flat border material having at least one non-linear edge; and attaching the ceramic electrolyte sheet to the frame using the seal such that the border material is positioned between the ceramic electrolyte sheet and the seal and such that at least a portion of the non-linear edge of the border material is positioned between the seal area of the ceramic electrolyte sheet and the active area of the sheet. In one embodiment, the border material has a non-linear edge where the solid oxide fuel cell device has an active area comprising more than one electrode and wherein the non-linear edge comprises at least one variation having a periodicity that is about the period of the cell spacing, a periodicity that is a about a multiple of the period of the cell spacing or an integer fraction, ½, ⅓, ¼, ⅕, ⅙, ⅐, ⅛, ⅑, ⅒ of the period of the cell spacing.

The inventors have noted that when the thermal expansion of the frame is greater than the electrolyte with cells, at room temperature the multiple cells can impose a periodic wrinkle pattern that extends into the street width from the active area on a thin electrolyte sheet. The inventors believe, while not wishing to be bound by theory, that by roughly matching the non-linear border edge to the period or a multiple or integer fraction of the cell spacing, the non-linear border can impose a regular pattern to the wrinkles and reduce the stress/strain in the street width region of the electrolyte improving reliability.

Uniform Thickness Seal

Another method in which stress related deformation and failure can be reduced and/or prevented is to attach a ceramic electrolyte sheet to a frame in a manner that provides a seal having uniform thickness. Not wishing to be bound by theory, a seal having a uniform thickness will create less stress on the seal and/or the ceramic electrolyte sheet than a seal having a variable thickness. One manner in which to form a seal of uniform thickness is to apply the seal to at least a portion of the ceramic electrolyte sheet prior to assembling the electrolyte sheet and the frame. Fabricating a solid oxide fuel cell device using a seal having a uniform thickness can result in a uniform distance across the device between the frame and the ceramic electrolyte sheet, thus reducing and/or eliminating at least a portion of the stress on the fuel cell components. The seal of the present invention can be any seal suitable for use in a solid oxide fuel cell, such as a metal foam, a felt, or a glass frit seal. It is preferred that the seal be a glass frit seal. Seal materials are commercially available and one of skill in the art could readily select an appropriate seal material for a solid oxide fuel cell.

In one embodiment, the present invention provides a method of making a solid oxide fuel cell comprising providing a frame and a device comprising a ceramic electrolyte sheet, applying a seal to at least a portion of the ceramic electrolyte sheet, and then attaching the device to the frame such that the seal has a uniform thickness. In another embodiment, a seal is applied to both at least a portion of the ceramic electrolyte sheet and at least a portion of the frame prior to attaching the electrolyte sheet to the frame. In another embodiment, the seal of the present invention is applied such that it has a uniform thickness and such that the distance between the frame and the device comprising the ceramic electrolyte sheet is consistent.

Seal Devolatilization

The seal of the present invention can optionally comprise at least one volatile component and, after contacting to the ceramic electrolyte sheet, the seal can be heated at a time and temperature sufficient to volatilize at least a portion of the volatile component in the seal, prior to sealing the device. The volatile component can be any material added to a seal or seal material prior to use, such as a processing aid. An exemplary volatile component is an organic solvent used in the preparation of a glass frit seal. The time and temperature can comprise heating at a temperature sufficient to volatilize at least a portion of the at least one volatile component, but not sufficient to soften and/or melt the seal and thus seal the device. The heating can comprise heating at a temperature of from about 100° C. to about 300° C., for example, about 100, 150, 200, 250, or 300° C., preferably at a temperature of from about 150° C. to about 250° C., for example, about 150, 175, 200, 225, or 250° C., for a period of at least about 1 hour.

In one embodiment, a seal comprises an organic solvent having a boiling point of about 200° C., and the seal is heated at a temperature of about 250° C. for a period of about 1 hour to de-volatilize the organic solvent, after application to the ceramic electrolyte sheet and prior to sealing the ceramic electrolyte sheet to the frame.

Although several embodiments of the present invention have been illustrated in the accompanying drawings and described in the detailed description, it should be understood that the invention is not limited to the embodiments disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Substantially Flat Border Material

Figure 6:
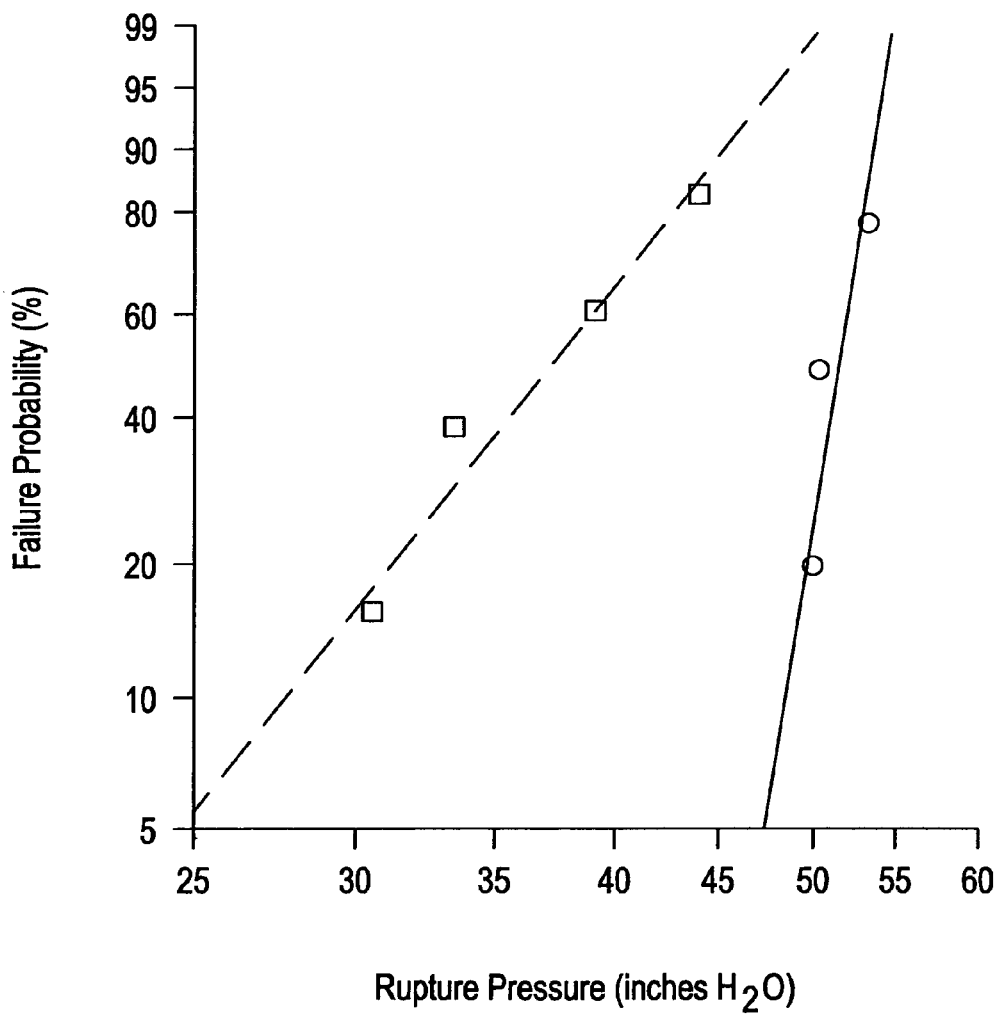
FIG. 6 illustrates the rupture pressure at 725° C. of various solid oxide fuel cell devices, some of which were prepared with a border material in accordance with various embodiments of the present invention.

In a first example, two sets of solid oxide fuel cell devices were prepared, one set (A) having a border material in accordance with various embodiments of the present invention, and the second set (B) having no border material. The thin (20 μm) ceramic electrolyte sheet and seal of all devices were of similar composition and construction. The rupture pressure of each prepared device was determined at 725° C., and compared, as illustrated in FIG. 6. A reduction in the probability of failure can be readily observed for the fuel cell devices comprising a border material.

Example 2

Overhang of Substantially Flat Electrolyte Sheet

In a second example, four sets (C, D, E, F) of solid oxide fuel cell devices were prepared. All devices prepared in this example comprised a 20 μm thick YSZ electrolyte sheet. The first set (C) of devices comprised a seal, a flat support frame (0° angle) and an overhanging electrolyte sheet. The second set (D) of devices comprised a seal, a flat support frame (0° angle) and a ceramic electrolyte sheet that did not overhang the seal area. The seals of both the first and the second sets of devices were pre-baked to remove any volatile components in accordance with the present invention. The third set (E) of devices comprised a seal, an angled frame support (2.5°), and a ceramic electrolyte sheet that did not overhang the seal area. The fourth set (F) of devices comprised a seal, an angled frame support (2.5°), and an overhanging ceramic electrolyte sheet. The seals of both the third and fourth sets of devices were not pre-baked to remove any volatile components.

Figure 7:
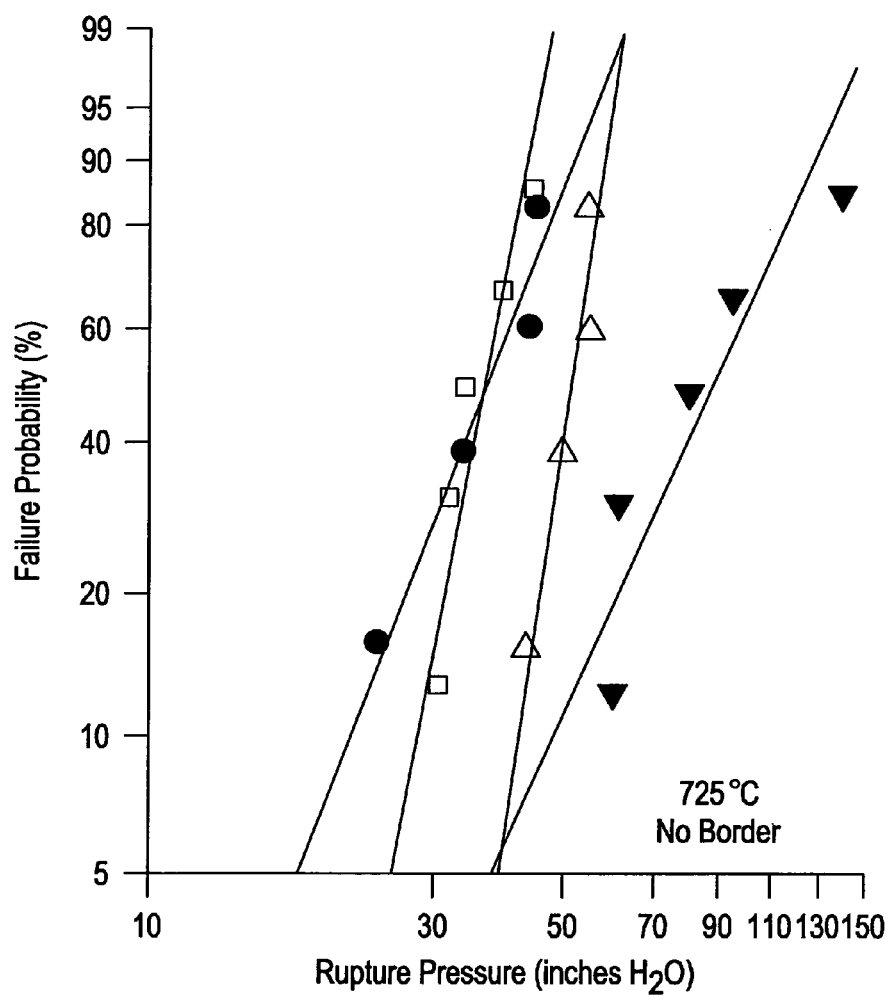
FIG. 7 illustrates the rupture pressure at 725° C. of various solid oxide fuel cell devices, some of which were prepared with an overhanging electrolyte sheet in accordance with various embodiments of the present invention.

The rupture pressure at 725° C. was determined for each of the fabricated devices and the results compared in FIG. 7. The results in FIG. 7 demonstrate that an increase in the survivability of a device against high pressures can be achieved when an electrolyte sheet overhangs the seal area.

Various modifications and variations can be made to the compositions, articles, devices, and methods described herein. Other embodiments of the compositions, articles, devices, and methods described herein will be apparent from consideration of the specification and practice of the compositions, articles, devices, and methods disclosed herein. It is intended that the specification and examples be considered as exemplary.

What is claimed is:

1. A solid oxide fuel cell device comprising:
   a frame;
   a ceramic electrolyte sheet connected to the frame, comprising:
      an active area positioned at the center of the ceramic electrolyte sheet;
      and an inactive area positioned around the active area, comprising:
         a street width area positioned adjacent to the active area, and a seal area connected to a seal and positioned around the street width area; and
   at least one border material disposed between the seal and the ceramic electrolyte sheet, wherein at least a portion of that one border material is in contact with at least a portion of the seal area, wherein the border material is substantially flat, and wherein the width of the at least one border material varies along its length.

2. The solid oxide fuel cell device of claim 1, further comprising a second border material, wherein at least a portion of the second border material is in contact with at least a portion of the seal area oppositely disposed from the at least one border material, and wherein the second border material is substantially flat.

3. The solid oxide fuel cell device of claim 1, wherein the thickness of the at least one border material is less than about 20 µm.

4. The solid oxide fuel cell device of claim 1, wherein the at least one border material comprises glass, ceramic, porous ceramic, at least partially stabilized zirconia, silver, palladium, or a combination thereof.

5. The solid oxide fuel cell device of claim 1, wherein the at least one border material comprises a plurality of layers.

6. The solid oxide fuel cell device of claim 1, wherein an adhesion promoter is applied to the surface of the border material or to the electrolyte sheet.

7. The solid oxide fuel cell device of claim 6, wherein the adhesion promoter comprises at least one transition metal oxide.

8. The solid oxide fuel cell device of claim 1, wherein the at least one border material has a first edge positioned in proximity to the frame and a second edge positioned in proximity to the street width area, wherein at least one of said edges is non-linear and wherein the non-linear edge comprises at least one variation, the variation having a wavelength of from about 0.5 mm to about 100 cm and an amplitude of from about 0.5 mm to about 5 cm.

9. The solid oxide fuel cell device of claim 1, wherein the at least one border material has a first edge positioned in proximity to the frame and a second edge positioned in proximity to the street width area, and at least one of said edges is sinusoidal.

10. The solid oxide fuel cell device of claim 1, wherein the active area comprises more than one electrode and wherein the non-linear edge comprises at least one variation having a wavelength that is a period of the cell spacing, a wavelength that is a multiple of the period of the cell spacing or an integer fraction of the period of the cell spacing.

* * * * *